(12) United States Patent
Huotari et al.

(10) Patent No.: US 9,565,561 B2
(45) Date of Patent: Feb. 7, 2017

(54) ALERT FOR ADDING CLIENT DEVICES TO A NETWORK

(75) Inventors: Allen J. Huotari, Garden Grove, CA (US); Shze Chew Lee, Irvine, CA (US); Yutai Koh, San Diego, CA (US); Tony Wan, Sunnyvale, CA (US)

(73) Assignee: Belkin International, Inc., Playa Vista, CA (US)

( * ) Notice: Subject to any disclaimer, the term of this patent is extended or adjusted under 35 U.S.C. 154(b) by 2382 days.

(21) Appl. No.: 11/940,120

(22) Filed: Nov. 14, 2007

(65) Prior Publication Data

US 2009/0122787 A1 May 14, 2009

(51) Int. Cl.
*H04W 12/06* (2009.01)
*H04L 29/06* (2006.01)

(52) U.S. Cl.
CPC .......... *H04W 12/06* (2013.01); *H04L 63/0853* (2013.01)

(58) Field of Classification Search
CPC .............................. H04L 63/0853; H04L 12/06
USPC ................. 370/352; 709/200, 205, 246, 225
See application file for complete search history.

(56) References Cited

U.S. PATENT DOCUMENTS

| | | | |
|---|---|---|---|
| 6,246,751 B1 * | 6/2001 | Bergl et al. .................. | 379/67.1 |
| 7,796,980 B1 * | 9/2010 | McKinney et al. .......... | 455/418 |
| 8,353,052 B2 * | 1/2013 | Larsson et al. ................. | 726/29 |
| 2004/0067736 A1 * | 4/2004 | Kamma ...................... | 455/41.2 |
| 2006/0010203 A1 * | 1/2006 | Mrsic-Flogel et al. ....... | 709/205 |
| 2006/0250987 A1 * | 11/2006 | White et al. .................. | 370/260 |

* cited by examiner

*Primary Examiner* — Khaled Kassim
(74) *Attorney, Agent, or Firm* — Haynes and Boone, LLP (57) ABSTRACT

In one embodiment, a method of configuring a network connectivity device comprises receiving a network association request from a prospective client device requesting access to a network and sending an alert signal to a control device to cause the control device to emit an audible signal indicative of a network association request from a prospective client device. A prompt message is sent to the control device to cause the control device to provide instructions on providing feedback to the network connectivity device. The network connectivity device receives feedback from the control device and permits or denies access to the network responsive to the feedback from the control device.

18 Claims, 6 Drawing Sheets

ALERT FOR ADDING CLIENT DEVICES TO A NETWORK

TECHNICAL FIELD

The present disclosure relates generally to networks and methods for configuring networks.

BACKGROUND

In conventional home networks and small office/home office (SOHO) networks, a router is used to connect the local-area network (LAN) to a wide-area network (WAN), such as the Internet. To improve the ease of implementing a LAN, combination devices are sold that combine into a single device multiple network connectivity functions, such as a router, a switch, and a wireless access point (WAP). This combination device can then be connected to a cable or DSL modem in order to provide WAN connectivity to all devices on the LAN. In other combination devices, the modem function is also bundled with the router, switch, and WAP functions. Users can typically configure and manage these network connectivity devices by using a personal computer (PC) to either access a browser-based graphical user interface (GUI) hosted by the router or a Setup Wizard application running on the PC. In either case, a PC, including keyboard and mouse input devices, is used to interface with the GUI to perform the desired functions or initiate the desired actions.

The "WiFi Protected Setup" specification created by the WiFi Alliance provided simplified procedures for configuring a secure wireless network. The procedures include a user providing feedback to confirm the addition of a new device to a network. The procedures for providing user feedback, however, are PC centric, requiring the user to manually enter a PIN via a graphical user interface (GUI), or involve pressing a button at the access point (the Push Button or PBC method). The setup methods are also generally "visual centric" in that they require the user to view system status information on a screen or through some other visual indicator. With the increased convergence of telephone functions and networked computing, it would be desirable to provide a system for enabling a user to utilize a telephone device to configure and manage network connectivity devices and to control access to the network.

DESCRIPTION

Overview

In one embodiment, a method of configuring a network connectivity device comprises receiving a network association request from a prospective client device requesting access to a network and sending an alert signal to a control device to cause the control device to emit an audible signal indicative of a network association request from a prospective client device. A prompt message is sent to the control device to cause the control device to provide instructions on providing feedback to the network connectivity device. The network connectivity device receives feedback from the control device and permits or denies access to the network responsive to the feedback from the control device.

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

DESCRIPTION OF EXAMPLE EMBODIMENTS

A network may be configured to provide an audible indication that a new client is attempting to associate with the network and provide a means for a user to interact with the network, responsive to the audible indication, to provide feedback to permit or deny the client access to the network.

Figure 1:
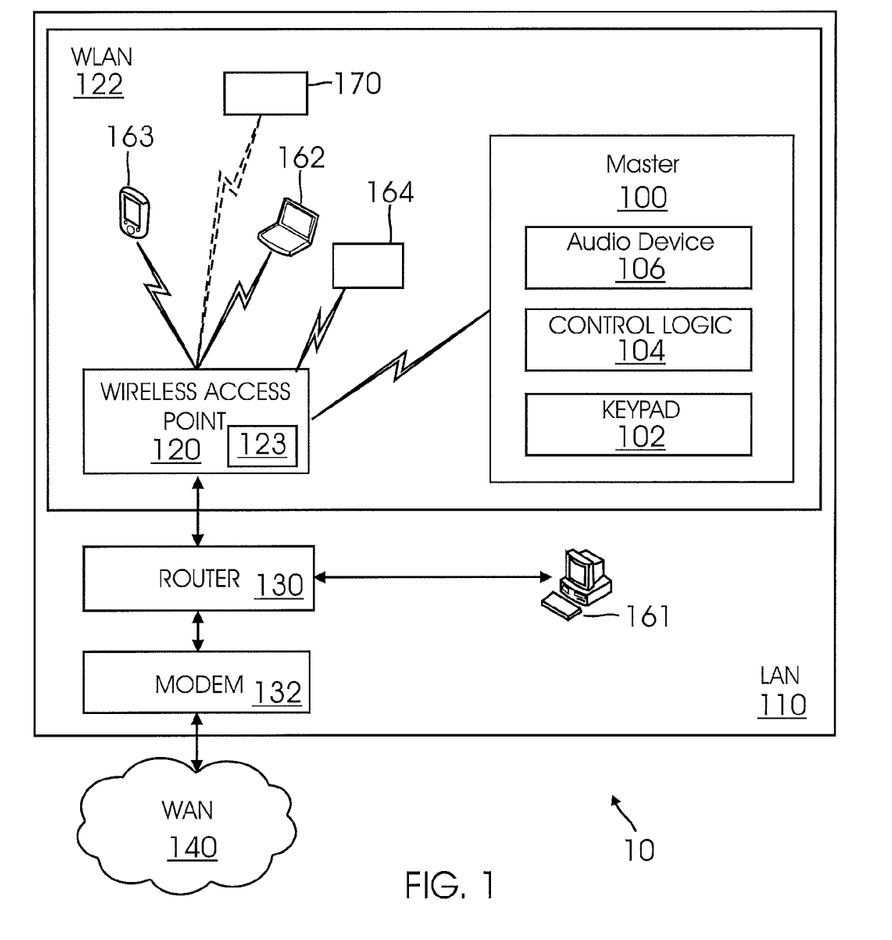
FIG. 1 is a block diagram showing an example data communications network for controlling access to a network, in accordance with embodiments of the present invention.

FIG. 1 is a block diagram showing an example data communications network 10. In the illustrated embodiment, the data communications network 10 comprises a local area network (LAN) 110 coupled to a wide-area network (WAN) 140, such as, e.g., the Internet. The LAN 110 includes a router (and/or switch) 130 coupled to a modem 132 that provides an interface to the WAN 140. The router 130 and the modem 132 may be implemented as separate devices or as a single unit, such as a gateway network device.

A wireless access point (WAP) 120 provides wireless network connectivity to the LAN 110 via a wireless local-area network (WLAN) 122. The WAP 120 may comprise any device that allows wireless-enabled computers and other devices to communicate with a wired network. The WLAN 122 may comprise a wireless network compliant with the standards governed by, e.g., IEEE 802.11 ("WiFi"), IEEE 802.15.1 ("Bluetooth"), ultra wideband (UWB) radio, and the like. The WAP 120 may also be implemented as a separate device or combined with the router 130. The WAP may have control logic 123 associated with controlling access to the LAN 110.

Multiple devices may be connected to the LAN 110. For example, one or more personal computers (PC) 161 may be coupled to the router 130 via conventional network cabling. In addition, other devices, such as, e.g., a laptop computer 162, a personal digital assistant (PDA) 163 or a multi-media device 164 may be configured to wirelessly connect to WLAN 122.

A network access control device or master 100 may be connected to the LAN 110. In an example embodiment, the master may be connected to the LAN 110 wirelessly as shown. The master 100 may include an audible sound producing (or audible alert) device 106, control logic 104 and a keypad 102. The audible sound producing device 106 and the keypad 102 may be incorporated into the same physical device or may be in two separate pieces that work together. In other embodiments, the master 100 may be connected to the LAN 110 via the router 130, or via the modem from the WAN 140.

The master 100 may be a telephone, for example a cellular phone, analog phone or VoIP phone with a ringer or speaker phone as the sound producing device 106 and the telephone keypad or dialer as the keypad 102. In other embodiments, the master 100 may include a set-top box with a speaker and an associated remote control with a keypad or may be some other media receiver with audio rendering capability to provide an audible signal and with some means to provide user feedback to permit or deny access to the LAN 110. The master may be a wireless or other device connected to the network by other physical media, for example coaxial cable, a power line, telephone line or other such connection.

When a new client 170 attempts to associate with the WAP 120, the control logic 123 may cause the WAP to send a signal to the master 100. The signal causes the master 100 to emit an audible alert signal from the sound producing device 106. The audible alert informs the user that a new client 170 is probing and/or associating with the LAN 110 for the purpose of joining the network 110. Such audible alerts may be provided by a master 100 that is already connected to the LAN 110.

The master may be configured to receive the signal from the WAP, the signal being indicative of a client 170 attempting to join the LAN 110. The master may have a sound producing device 106 such as a speaker capable of making an audible signal responsive to the signal. The signal may cause the master to ring, in the case of a phone, or make some other audible buzzer, tone or sound indicative of an attempt to join the LAN 110. The audible signal may be a unique or distinctive signal indicative of a client attempting to join the LAN 110. For example, in the case of a phone, the phone may ring with a distinctive signal. In the case of other types of master 100 devices, the set-top box speaker may emit a distinctive tone or audible signal or some other media receiver with audio rendering capability may emit a distinctive audible signal indicative of the new client 170 attempting to join the LAN 110.

The WAP 120 may also provide a signal carrying a recorded or synthesized voice message to be played following the audible alert. The voice message may provide instructions on how to respond to the signal to either permit or deny access to the LAN 110. The master 100 may also be configured to play or render the spoken word message in an audible format. For example, in the case of a telephone, the telephone earpiece or speaker phone speaker may play back the voice message as received from the access point after the user answers the phone. In the case of a set-top box, the set-top box may have a speaker capable of playing back the voice message. The speaker may be the same sound producing device 106 or speaker that emits the audible alert signal. In the case of some other multi-media device or media receiver with audio rendering capability, the device may play the spoken word message.

The audible signal or spoken word message may prompt the user to provide some feedback to the WAP to deny or permit the new client 170 to associate with the LAN 110. The feedback may be provided through the keypad 102 or other feedback input device, for example a button or keypad on a phone or remote control or through a speech recognition device. The feedback may be made in the form of simply pressing a particular button on a keypad, entering a PIN on a keypad or saying the PIN or word or words indicative of permitting or denying access within hearing distance of a sound pickup device connected to a speech recognition software or device. In some embodiments, taking no action may result in access being denied.

The spoken word or voice message may provide instructions, for example, something along the lines of, "a wireless device wants to join your network. Please press the (key1) to allow this or press the (key2) to deny. Not pressing a key or hanging up without responding will automatically deny." The key 1 may be the * key or # key or other key on a telephone handset. The key1 and key2 may be particular keys on a remote control for a set-top box, for example a dedicated button on the remote control. In other embodiments, the instructions may be something along the lines of, "a wireless device wants to join your network. Please enter the (n) digit PIN (or personal identifier) found on the wireless device using the keypad of this phone (or remote control)." The number of digits for a PIN may be predetermined and the user may have pre-programmed the system to respond to a particular, known PIN.

The feedback commands may be transmitted by the master to the router in a variety of ways. For example, the control logic 104 for the master 100 may be configured to transmit messages to the router 130 using a variety of communication protocols, such as, e.g., Extensible Markup Language (XML), Simple Network Management Protocol (SNMP), HyperText Markup Language (HTML), HyperText Transfer Protocol (HTTP), or Simple Object Access Protocol (SOAP). The router 130 may be configured to respond to the messages from the master 100 using a similar protocol.

The WAP may be programmed to send appropriate alert signals and voice messages responsive to a new client 170 attempting to gain access to the LAN 110. The master 100 may interpret the signal and play back the appropriate message.

Figure 2:
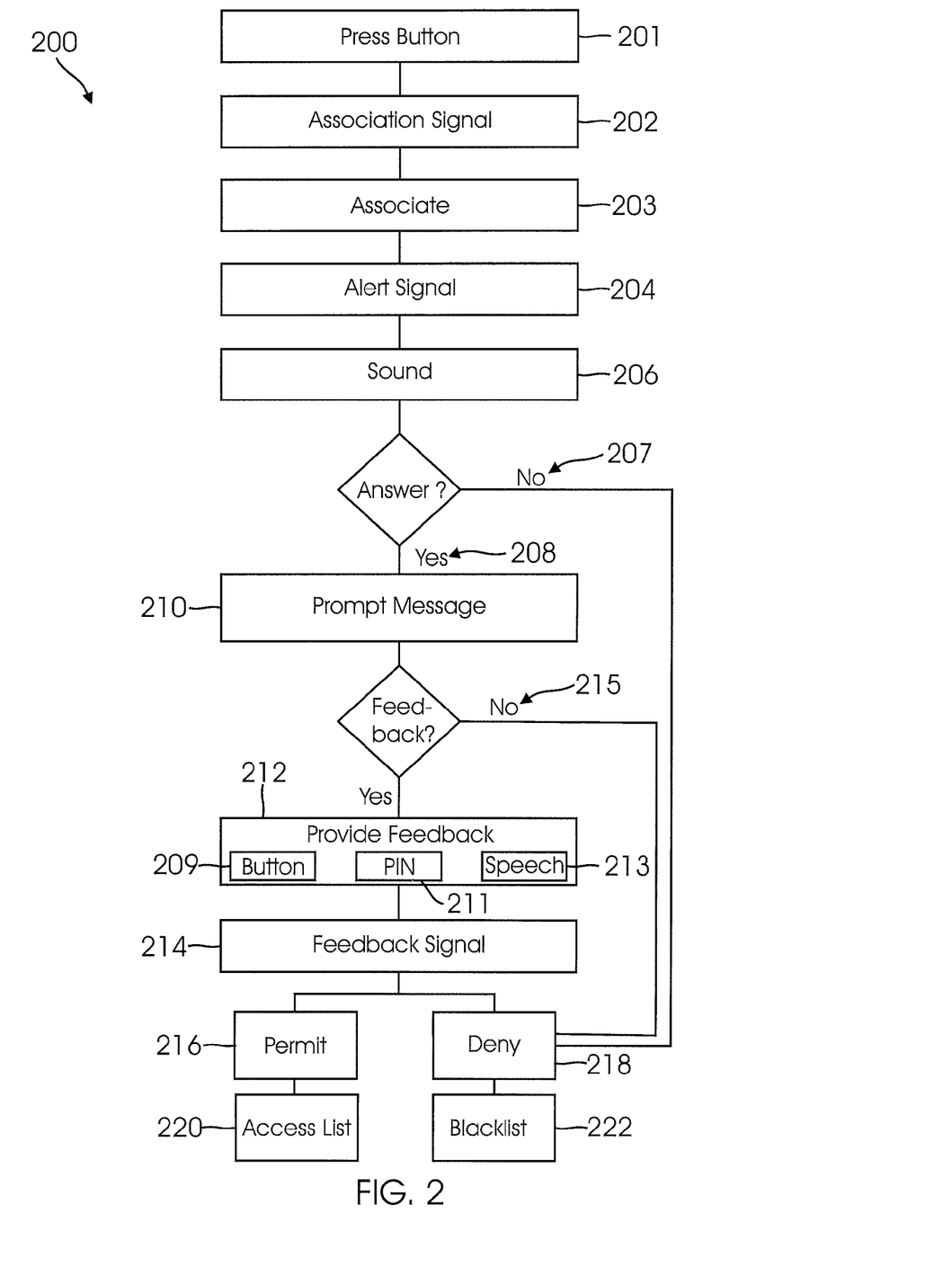
FIG. 2 is a flowchart illustrating a method of controlling access to a network using a control device having a limited keyboard, in accordance with embodiments of the present invention.

FIG. 2 is a flowchart illustrating an example method of providing an audible signal indicative of a new client attempting to access a network and providing feedback indicative of permitting or denying access to the network by the new client. The network has a network connectivity device, namely a device that connects LANs or segments of LANs, such as a repeater, hub, bridge, router, or switch. These network connectivity devices may operate in one or more of the physical, data link, and network layers of the network model. The network connectivity device may include a router, such as the type used in home networks and/or other devices in the LAN, such as, e.g., a combination device incorporating both the WAP 120 and the router 130.

In an example embodiment, a user may desire to add a wireless device to an existing network. The network may be WiFi Protected Setup or may use another security protocol, for example, Secure Easy Setup (SES). The user may push a button 201 on the client attempting to be added to the network. The client may then send an association signal 202 to an access point to associate with the network 203, for example when the client and access point exchange association messages. Upon association, the access point may send an alert signal 204 to a master control device that is already on the network. The master then sounds an audible ring, tone, buzzer or other audible sound 206 indicative of the client attempting to associate with the network. In the case of a telephone, the signal may cause the phone to ring. In the case of a set-top box or other media receiver with audio rendering capability, the signal may cause the device to playback a message on the audio system. The audio message may include a distinctive ring or tone, a single tone, set of tones, music, speech, or any other audible indicator representative of a client attempting to join the network. It may be desirable to have the ring be distinctive and indicative of a client attempting to associate with or join the network.

The master may have an audible sound device that renders an audible signal or alarm 206, for example a distinctive or unique audible signal or alarm for the purposes of alerting a user to an attempt by a new client to join the network. In some embodiments, for example where the master is a phone, the user may take action to receive a follow on spoken word message 208, for example by answering the phone. For example, the user may answer the phone, press a button on the set-top box, press a button on a remote control, or press a button on a multi-media device or other media device. The access point may then send the spoken word message 210. In some embodiments, the spoken word message may be sent immediately following sending the audible signal or alarm 206. For example, a set-top box may have a speaker that plays the spoken word message immediately following the alarm or signal.

In an example embodiment, a user answering the telephone may hear a voice message indicative of there being a client attempting to connect to the network and providing instructions on how to take some action or provide appropriate feedback to permit or deny access to the network. In a PBC mode, for example, the action may be, for example, pressing a specific button indicative of "allow" or a specific button indicative of "deny". Pressing the appropriate button may send a signal to the access point which will control the access point to either permit or deny access as appropriate based on the received signal. In a PIN mode, on the other hand, the action may be entering a PIN into a keypad. The keypad may be a keypad on a telephone handset or a keypad on a remote control device coupled with a set top box.

The spoken word message may prompt the user to take a specific action or provide feedback to the access point to permit or deny access to the network by the new client. The user may then provide a feedback 212. The feedback may be in the form of pressing a specific button 209 on the handset, remote control or multi-media device, entering a PIN 211 on a handset, remote control or multi-media device, or speaking a word or words 213 indicative of either allowing or denying access to a receiver, for example "yes" or "permit" to permit access, or "no" or "deny" to deny access. Speech recognition software or technology may interpret the spoken feedback and cause the access point to take the appropriate action. The speech recognition device or software may be resident on the access point, master or other device coupled with the access point.

The master may then send a feedback signal 214 to the WAP. The WAP may then take appropriate action, either permitting the client to join a network 216 or denying the client permission to join the network. In some embodiments, if the user does not enter any feedback 215, the WAP's control logic may determine that access is to be denied and then may take action to deny access 218. If the master is a telephone, if the telephone is not answered 207, the WAP's control logic may determine that access is to be denied and then may take action to deny access 218.

In the event that access is granted, the WAP may store identifying information related to the client in a list of clients permitted to join the network 220. The stored information may be accessed the next time the client attempts to access the network and the WAP may permit access without sending an alert or waiting for feedback. In the event that access is denied, the WAP may store identifying information related to the client in a list of clients to be denied permission to join the network 222, or blacklist the device. The stored information may be accessed the next time that the client attempts to access the network and the WAP may deny access without sending an alert or waiting for feedback.

WiFi Enabled Phone

Figure 3:
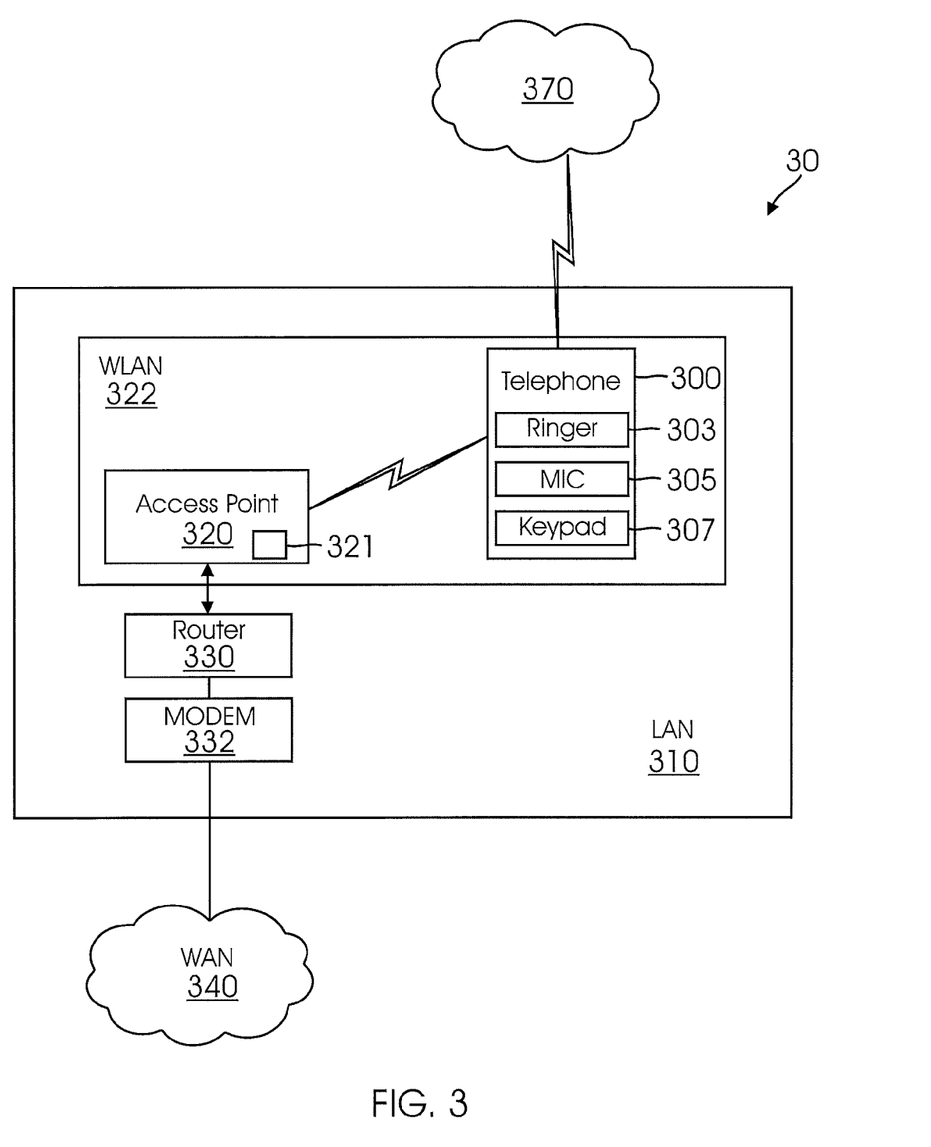
FIG. 3 is a block diagram showing an example data communications network for controlling access to a network, in accordance with embodiments of the present invention.

FIG. 3 is a block diagram showing an example embodiment of a data communications network 30 with a WiFi enabled phone 300 as the master for providing an audible signal indicative of a new client attempting to join the network and a means for providing feedback indicative of permitting or denying the new client access to the network, in accordance with another embodiment of the present disclosure.

In the illustrated embodiment, the data communications network 30 comprises a local area network (LAN) 310 coupled to a wide-area network (WAN) 340, such as, e.g., the Internet. The LAN 310 includes a router (and/or switch) 330 coupled to a modem 332 that provides an interface to the WAN 340. The router 330 and the modem 332 may be implemented as separate devices or as a single unit, such as a gateway network device. A wireless access point (WAP) 320 provides wireless network connectivity to the LAN 310 via a wireless local-area network (WLAN) 322.

When a new client attempts to gain access to the LAN 310, the WAP 320 sends a signal to the WiFi enabled telephone 300 that is already connected to the network. The telephone 300 has a ringer 303 that rings in response to the signal. The ring may be a distinctive ring. If the user answers the telephone, the WAP 320 sends a signal carrying a spoken voice message that the user can hear through the earpiece or speaker phone speaker on the telephone 300. The message prompts the user to provide feedback indicative of permitting access or denying access to the LAN 310. For example, the message may prompt the user to press a certain key for permit and a certain other key for deny or may prompt the user to enter a sequence of keys or a PIN through the keypad 307. In other embodiments, the user may provide feedback by speaking into a microphone 305, for example saying a word or words, such as "deny" or "no" to deny access or "yes" or "permit" to permit access. Speaker recognition technology in the control logic 321 of the access point 320 may interpret the response and cause the WAP to take appropriate action to permit or deny access accordingly.

In an example embodiment, the telephone handset 300 is a dual-mode mobile station configured to establish wireless network connectivity to two different types of wireless networks. Handset 300 may be capable of establishing a first network connection to the WLAN 322 via the WAP 320, and a second network connection to a mobile communications network 370. When the handset 300 is within the coverage area of the WLAN 322, the handset 300 communicates encoded Internet Protocol (IP) packets (either voice bearing or data bearing) to and from the WAP 320. When the handset 300 is beyond the coverage area of the WLAN 322, the handset 300 utilizes the mobile communications network 370 for communication. The mobile communications network 370 may utilize any of a variety of mobile communications network protocols, such as, e.g., a Global System for Mobile Communications (GSM) system that incorporates General Packet Radio Service (GPRS), Code Division Multiple Access (CDMA), or Time Division Multiple Access (TDMA).

A dual-mode cellular phone, such as telephone handset 300, enables a user to utilize VoIP, which allows users to bypass standard phone lines by using the Internet for placing and receiving telephone calls. In addition, a user may utilize a dual-mode cellular phone to transmit and receive data via the WLAN, without utilizing the cellular network. Thus, WLANs permit dual-mode mobile device users to bypass the traditional cellular network by using the Internet to route telephone calls instead. This can potentially reduce communication costs for users and cellular service providers by reducing the amount of cellular bandwidth utilized by the cellular phone for voice and data. In other embodiments, the telephone handset 300 does not also include cellular functionality and only establishes a network connection to the WLAN 322. Therefore, the mobile communications network 370 may be omitted.

Because the telephone handset 300 is intended primarily for voice communication, the input device for the handset 300 includes a limited keypad. A limited keypad is an input device having fewer keys than a full QWERTY keyboard, as is commonly provided on PC desktop and laptop computers which are designed for extensive manual data input. One commonly used limited keypad is the numeric keypad found on conventional analog telephones, which includes keys for the numbers 0-9, a star (*) key, and a pound (#) key. The feedback to permit or deny access to the network may be made by pressing specific keys or a sequence of specific keys in response to the prompts. The control logic 321 of the access point may interpret the signals and take appropriate action to deny or permit access to the network.

Analog Phone

Figure 4:
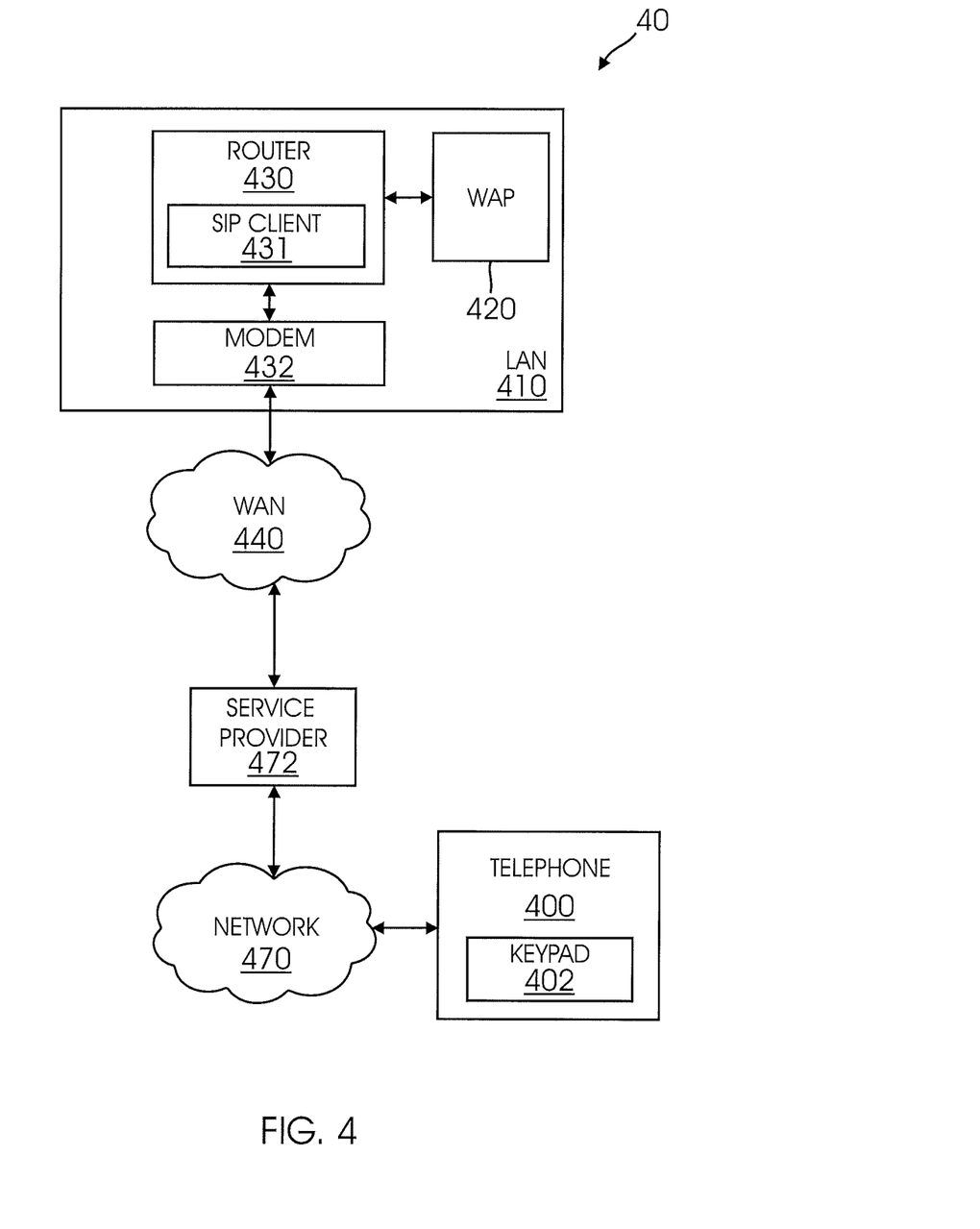
FIG. 4 is a block diagram showing an example data communications network for controlling access to a network, in accordance with embodiments of the present invention.

FIG. 4 is a block diagram showing an example embodiment of a data communications network 40 with a master for providing an audible signal indicative of a new client attempting to join the network and a means for providing feedback indicative of permitting or denying the new client access to the network, in accordance with another embodiment of the present disclosure. In an example embodiment, the master may be a telephone, for a cellular phone or an analog phone 400, for example an ATA (standalone or integrated).

In the illustrated embodiment, the data communications network 40 comprises a LAN 410 coupled to a WAN 440. The LAN 410 includes a router 430 coupled to a modem 432 and a WAP 420 coupled to the router 430. The router 430 includes a VoIP client 431, for example with an IP telephone protocol such as SIP, MGCP or H.323, which enables the router 430 to interface with any standard analog telephone by responding to the Dual-Tone Multi-Frequency (DTMF) tones generated when the keys of the analog telephone are pressed. The router 430 may be provided with VoIP ports for connection with a telephone, or may not be provided with such ports.

In this embodiment, when the WAP receives a signal indicative of a new client attempting to access the LAN 410, the WAP initiates a signal in the form of a telephone call with a voice message to be sent to the analog telephone 400. The telephone may ring in response to the phone call. The telephone may be pre-programmed with a distinctive ring indicative of a new client attempting to join the LAN 410. The user may then utilize a standard analog telephone 400 having a standard twelve key (0-9, #, *) keypad 402 to provide feedback to the WAP 410 via the router 430 to permit or deny access to the LAN 410. This telephone 400 is connected to the telephone network 470, for example a cellular phone network or a Public Switched Telephone Network (PSTN) which is switched to the WAN 440 by the telephone service provider 472. In order to connect with the router 430, the user answers the call from the WAP. Answering the call may cause the WAP to send a spoken word message to prompt the user to take appropriate action to send feedback to the WAP indicative of permitting or denying access to the LAN 410. The user may enter a keypad sequence into the keypad 402. The keypad sequence signals may be routed to the WAP which will take the appropriate action responsive to the feedback.

Remote/Box

Figure 5:
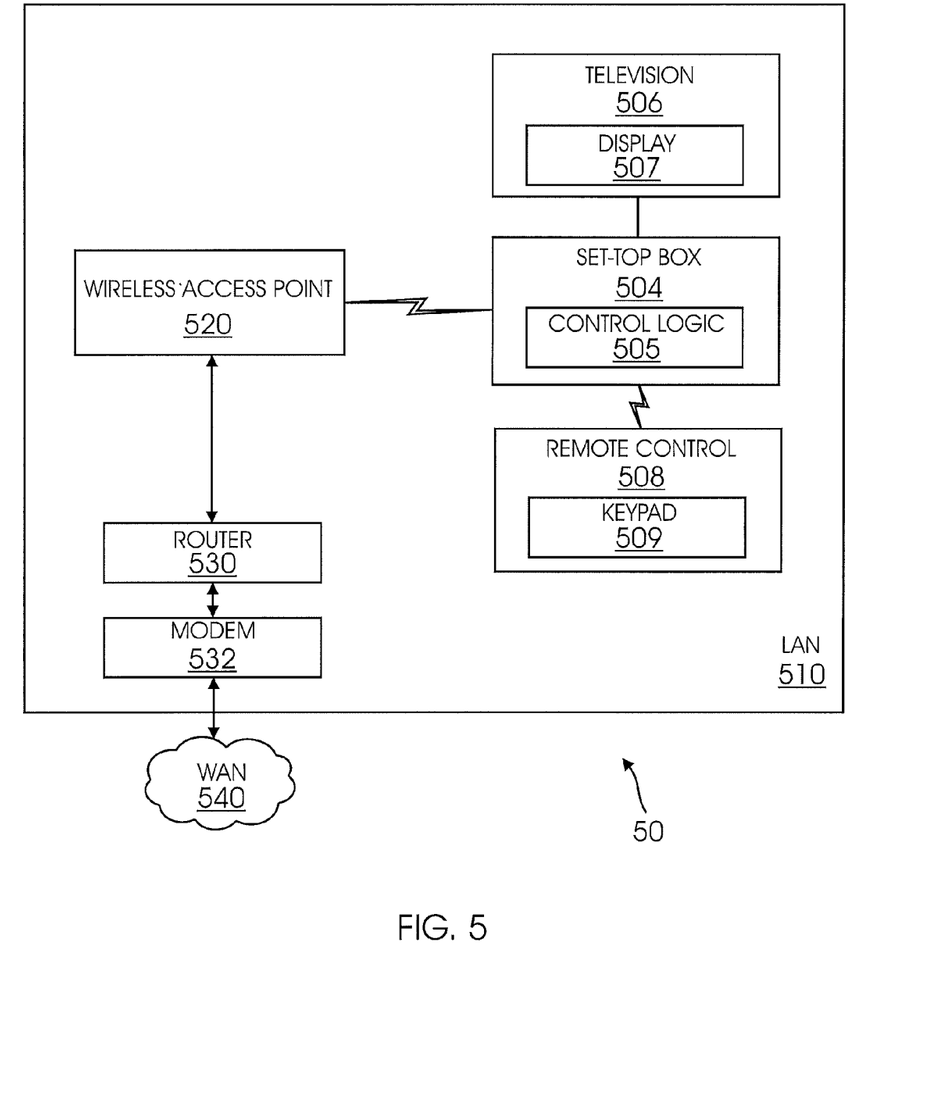
FIG. 5 is a block diagram showing an example data communications network for controlling access to a network, in accordance with embodiments of the present invention.

FIG. 5 is a block diagram showing an example embodiment of a data communications network 50 with a master for providing an audible signal indicative of a new client attempting to join the network and a means for providing feedback indicative of permitting or denying the new client access to the network, in accordance with another embodiment of the present disclosure.

In the illustrated embodiment, the data communications network 50 comprises a LAN 510 coupled to a WAN 540. The LAN 510 includes a router 530 coupled to a modem 532. A WAP 520 provides wireless network connectivity to the LAN 510 via a WLAN.

In this embodiment, when the WAP 520 receives an association request from a new client, the WAP 520 may send an alert signal to the set-top box 504 to cause the set-top box to emit an audible signal or alarm. The set-top box may have a speaker or other device which can render sound responsive to signals from the WAP 520. The user may then utilize a remote control device 508 to provide feedback to the WAP to permit or deny access to the LAN 510. This remote control 508 may be similar to conventional remote controls and include a wireless interface for transmitting control signals to, e.g., a television, a set-top box (STB), a home theater receiver, a home automation system, and the like. The wireless interface may be, for example, IR, Bluetooth or other wireless technology. Like conventional remote controls, the remote control 508 includes a limited keypad 509 having fewer keys than a standard QWERTY keyboard. The keypad 509 may include, for example, number keys 0-9, volume up/down, channel up/down, and other keys conventionally used for controlling entertainment devices.

The remote control 508 transmits wireless signals to a set-top box (STB) 504, which includes control logic 505. The STB 504 may be primarily used to receive signals, e.g., from a satellite dish, a cable line, or a computer on the LAN 510, to cause a video image to be displayed on the display 507 of a television 506. The control logic 505 enables the STB 504 to transmit commands to the router 530.

Once the alert signal has been received, the control logic 505 of the STB 504 may make the STB 504 ready to receive a signal from the remote control 508. Once the control logic 505 recognizes that the access procedure has been initiated, appropriate subsequent keypad sequences can be used to designate various commands to be transmitted to the router 530.

The STB 504 may use the display 507 of the television 506 to display a message to the user prompting the user to take appropriate action. The display may be in addition to or as an alternative to the spoken word or voice message to be played from the speaker. When the user presses the appropriate key or sequence of keys, the STB 504 communicates a signal to the WAP to take the appropriate permission or denial of access.

VoIP

Figure 6:
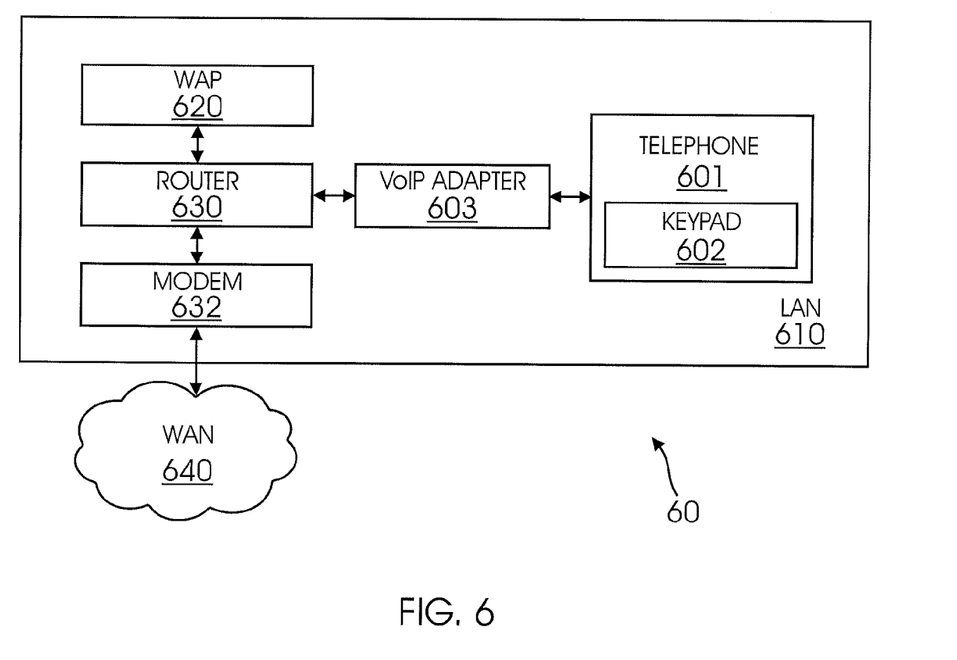
FIG. 6 is a block diagram showing an example data communications network for controlling access to a network, in accordance with embodiments of the present invention.

FIG. 6 is a block diagram showing an example embodiment of a data communications network 60 with a master for providing an audible signal indicative of a new client attempting to join the network and a means for providing feedback indicative of permitting or denying the new client access to the network, in accordance with another embodiment of the present disclosure.

In the illustrated embodiment, the data communications network 60 comprises a LAN 610 coupled to a WAN 640. The LAN 610 includes a router 630 coupled to a modem 632 and a VoIP adapter 603. A standard analog telephone 601 having a limited keypad 602 is coupled to the VoIP adapter 603. This telephone 601 may be used to receive calls over a VoIP protocol. The use of the telephone 601 to receive a signal and to provide feedback indicative of permitting or denying access to the LAN 610 is substantially similar to the use of the handset 300 in FIG. 3. However, in this embodiment, the telephone 601 is coupled to the router 630 via network cabling. The router 630 may be coupled to a WAP 620. The WAP may be configured to receive association requests, to initiate signals indicative of an association request, to receive feedback regarding action to take with respect to the association request, and to take action to permit or deny access to the LAN 610 in response to feedback.

In another embodiment, the telephone device having the limited keypad is VoIP telephone that has a wired connection to a router in a LAN. In this case, because the telephone is already VoIP-enabled, a separate VoIP adapter 603 may not be needed. In other embodiments, the VoIP adaptor 603 may integrated with the router 630.

In an example embodiment, the alert device may be part of a network-attached A/V system or multi-media device. The alerting device may be a server (source) which upon being signaled may push an audio file (wav, mp3 or the like) to a renderer (sink) for playback. In another embodiment, the alerting device may be a renderer (sink) which upon being signaled may pull an audio file (wav, mp3 or the like) from a server (source) for playback.

In an example embodiment, the network may be a physically heterogeneous network, in other words a network with a mix of wired and wireless nodes, or logically heterogeneous, in other words VLANs, multiple SSIDs, differing security policies, or both. The network may be programmed to discriminate which network that the device being added is trying to join. For example, a wireless phone being added may have its alert signal sent to an existing telephone node on the network. The addition of a new multimedia device to a powerline network could have its alert sent to an existing audio device. Such options may be programmable by the end user based on personal preferences.

In an example embodiment, a speech recognition system could be used for allowing, denying access or for entering a PIN by prompting the user to speak an appropriate command or series of commands. The speech recognition technology or software may be resident in a set-top box, an A/V or multimedia device, a telephone or in the WAP.

In an example embodiment, failing to pick up the phone to hear the message may result in automatic denial of access to the network. For example, a user hearing a distinctive ring who has not personally added a device recently may know that device being added is not permitted to access the network and may ignore the ring. The WAP may be pre-programmed to deny access when the telephone does not answer. The WAP may also be pre-programmed to blacklist a device when the telephone does not go off hook. In an example embodiment, the WAP may send the alert signal only when the device being added has not been permitted to join the network previously or where the membership to the network has expired.

With the increased convergence of telephone functions and networked computing, a system or method in accordance with this disclosure may be desirable as it may enable a user to utilize a telephone device to configure and manage network connectivity devices and to control access to the network. With the increased availability of broadband Internet connections, the use of Voice over Internet Protocol (VoIP) to make telephone calls over the Internet has increased. Various hardware manufacturers have developed VoIP-enabled telephone devices to make use of this technology. Some of these VoIP telephone handsets are similar in design to conventional analog telephones, but can be used to place telephone calls over a LAN using VoIP technology. WiFi VoIP handsets may be used over wireless LANs (WLANs) using VoIP and WiFi technology. In addition, dual-mode mobile telephone devices have been developed which are capable of transmitting voice communications using VoIP over WLANs and also using traditional cellular communications networks. Despite the increased availability of VoIP-enabled telephone devices, the limited numeric keypad, small display, and limited processing power of these telephones has restricted the telephones' utilization for performing functions other than voice communication and simple gaming. Systems and methods in accordance with this disclosure may address some of these problems or limitations.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
   receiving, at a network access device, a network association request from a prospective client device requesting access to a network;
   sending, by the network access device in response to receiving the network association request, an alert signal to a control device to cause the control device to emit an audible signal indicative of a network association request from a prospective client device;
   sending, by the network access device in response to receiving the network association request, a prompt message to the control device to cause the control device to provide voice instructions on how to provide feedback to the network access device for responding to the network association request based on the control device and is different for different types of control devices;
   receiving, by the network access device, feedback from the control device, the feedback comprising a keypad sequence representative of a personal identifier (PIN); and
   permitting or denying, by the network access device, access to the network for the prospective client device responsive to the feedback from the control device.

2. The method of claim 1, wherein the control device comprises a telephone.

3. The method of claim 2, further comprising: receiving a signal indicative of the telephone being answered before sending the prompt message.

4. The method of claim 2, wherein the feedback comprises a signal representative of hanging up the telephone and further comprising denying access to the network.

5. The method of claim 1, wherein the control device comprises a set-top box and a remote control device.

6. The method of claim 1, wherein the control device comprises a multi-media device.

7. The method of claim 1, further comprising:
receiving identifying information from the prospective client device;
comparing the identifying information with information stored in a list of permitted devices; and
sending the alert signal to the control device only if the identifying information does not correspond to a permitted device stored in the list of permitted device.

8. The method of claim 1, further comprising:
receiving identifying information from the prospective client device; and
saving the identifying information in a list of blacklisted devices if the prospective client device is denied access to the network.

9. The method of claim 1, further comprising:
receiving identifying information from the prospective client device;
determining a type of device corresponding to the prospective client device;
determining which one of a plurality of control devices should receive the alert signal based on the type of device that the prospective client device is determined to be; and
sending the alert signal to the one of the plurality of control devices.

10. A non-transitory machine-readable medium comprising a plurality of machine-readable instructions which when executed by one or more processors of a network access device are adapted to cause the network access device to perform a method comprising:
receiving a network association request from a prospective client device requesting access to a network;
receiving identifying information from the prospective client device;
determining a type of device corresponding to the prospective client device;
determining which one of a plurality of control devices should receive an alert based on the type of device that the prospective client device is determined to be;
sending, in response to receiving the network association request, the alert to the determined one of the plurality of control devices;
sending, in response to receiving the network association request, a prompt message to the determined one of the control devices to cause the determined one of the control devices to provide voice instructions on how to provide feedback to the network access device for responding to the network association request based on the determined one of the control devices and is different for different types of control devices;
receiving the feedback from the determined one of the control devices; and
denying or permitting access to the network by the prospective client device responsive to the feedback.

11. The non-transitory machine-readable medium of claim 10, wherein the determined one of the control devices comprises one of a telephone, set-top box or multi-media device.

12. The non-transitory machine-readable medium of claim 10, wherein the method further comprises:
storing data representative of a list of approved devices and a list of blacklisted devices;
accessing the stored data to determine whether the prospective client device is an approved device or a blacklisted device;
permitting access to the network for an approved device and denying access to the network for a blacklisted device;
storing identifying data of the prospective client device in the list of approved devices if the prospective client device is permitted access to the network responsive to feedback from the determined one of the control devices; and
storing identifying data of the prospective client device in the list of blacklisted devices if the prospective client device is denied access to the network responsive to feedback from the determined one of the control devices.

13. A device, comprising:
one or more processors; and
a memory coupled to one or more of the processors comprising instructions executable by one or more of the processors, one or more of the processors operable when executing the instructions to:
receive an association request from a prospective client device requesting access to a network;
receive identifying information from the prospective client device;
determine a type of device corresponding to the prospective client device;
determine which one of a plurality of control devices should receive an alert based on the type of device that the prospective client device is determined to be;
send, in response to receiving the association request, the alert to a determined one of the control devices;
send, in response to receiving the association request, a prompt message to the determined one of the control devices to cause the determined one of the control devices to provide voice instructions on how to provide feedback to the device for responding to the association request based on the determined one of the control devices and is different for different types of control devices;
receive the feedback from the determined one of the control devices; and
deny or permit access to the network by the prospective client device responsive to the feedback.

14. The device of claim 13, wherein the determined one of the control devices comprises one of a telephone, set-top box or multi-media device.

15. The device of claim 13, wherein the one or more of the processors are further operable when executing the instructions to:
store data representative of a list of approved devices and a list of blacklisted devices;
access the stored data to determine whether the prospective client device is an approved device or a blacklisted device;
permit access to the network for an approved device and denying access to the network for a blacklisted device;

store identifying data of the prospective client device in the list of approved devices if the prospective client device is permitted access to the network responsive to feedback from the determined one of the control devices; and store identifying data of the prospective client device in the list of blacklisted devices if the prospective client device is denied access to the network responsive to feedback from the determined one of the control devices.

16. The device of claim 13, wherein the one or more of the processors are further operable when executing the instructions to: deny access to the network when no feedback is received from the determined one of the control devices.

17. The non-transitory machine-readable medium of claim 10, wherein the feedback comprises a keypad sequence representative of a personal identifier (PIN).

18. The device of claim 13, wherein the feedback comprises a keypad sequence representative of a personal identifier (PIN).

* * * * *